(12) United States Patent
Mintgen et al.

(10) Patent No.: US 6,524,512 B1
(45) Date of Patent: Feb. 25, 2003

(54) METHOD OF MAKING A SUPPORT OF POLYMERIC MATERIAL HAVING A SEALING RING

(75) Inventors: Rolf Mintgen, Thür (DE); Alexander Reiser, Koblenz (DE)

(73) Assignee: Stabilus GmbH, Koblenz (DE)

( * ) Notice: Subject to any disclaimer, the term of this patent is extended or adjusted under 35 U.S.C. 154(b) by 156 days.

(21) Appl. No.: 09/651,655

(22) Filed: Aug. 30, 2000

(30) Foreign Application Priority Data

Sep. 3, 1999 (DE) .......................... 199 42 010

(51) Int. Cl.⁷ .................. B29C 45/14; B29C 33/42; B29C 45/44
(52) U.S. Cl. ............... 264/255; 264/295; 264/318; 264/328.1; 264/334
(58) Field of Search ................. 264/250, 254, 264/255, 259, 267, 268, 273, 275, 295, 296, 318, 328.1, 334

(56) References Cited

U.S. PATENT DOCUMENTS

| | | | | |
|---|---|---|---|---|
| 3,832,437 A | * | 8/1974 | Taylor | 249/170 |
| 4,209,485 A | * | 6/1980 | Greenspan | 137/537 |
| 4,521,367 A | * | 6/1985 | Underwood | 264/318 |
| 4,532,856 A | | 8/1985 | Taylor | |
| 4,728,084 A | | 3/1988 | Bauer et al. | |
| 4,934,668 A | * | 6/1990 | Vassmer | 188/322.17 |
| 5,154,264 A | * | 10/1992 | Poertzgen et al. | 188/285 |
| 5,253,577 A | * | 10/1993 | Schonlau et al. | 264/318 |
| 5,615,867 A | * | 4/1997 | Bauer | 188/321.11 |
| 5,988,605 A | * | 11/1999 | Weisser et al. | 188/300 |

FOREIGN PATENT DOCUMENTS

| | | |
|---|---|---|
| DE | 834 140 | 2/1952 |
| DE | 44 12 179 | 10/1995 |
| DE | 297 20 483 | 3/1998 |
| DE | 196 40 510 | 4/1998 |
| DE | 197 146 47 | 10/1998 |
| DE | 41 19 090 | 8/1999 |
| EP | 0 217 013 | 4/1989 |
| EP | 0 510 650 | 10/1992 |
| EP | 0 383 303 | 4/1994 |
| FR | 2 238 389 | 2/1975 |
| GB | 2 246 186 | 1/1992 |

* cited by examiner

Primary Examiner—Angela Ortiz

(57) ABSTRACT

A method is provided for making an injection-molded support of polymeric material having a cylindrical portion having an axis and an end, an annular groove for a sealing ring located proximate to the end of the cylindrical portion and defined by a base surface, a sealing surface and a ring-retaining surface, the sealing surface being farther from the end of the cylindrical portion than the ring-retaining surface. The base surface, a sealing surface, and either a seat portion for a flange formed in a separate molding step that provides the ring-retaining surface of the groove or the entirety of a flange that provides the ring-retaining surface of the groove are formed by a cavity of a mold part that separates from the support in the direction of the axis of the cylindrical portion.

9 Claims, 4 Drawing Sheets

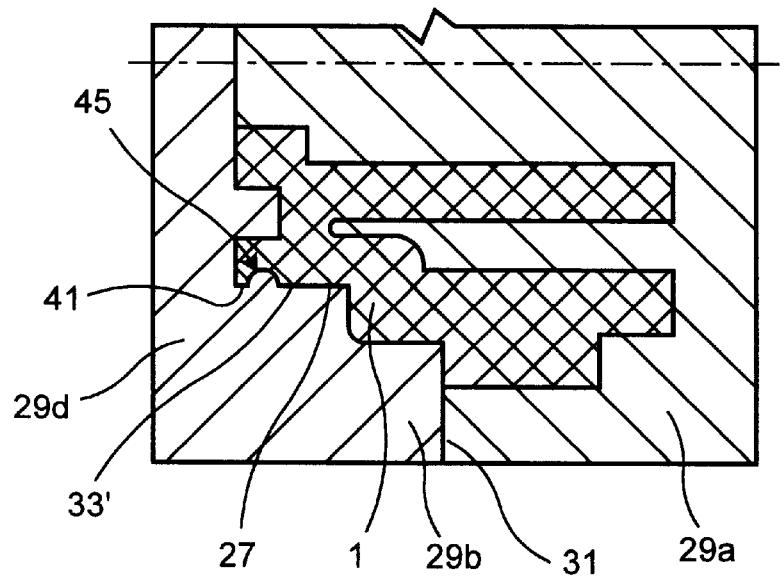
F I G. 3a
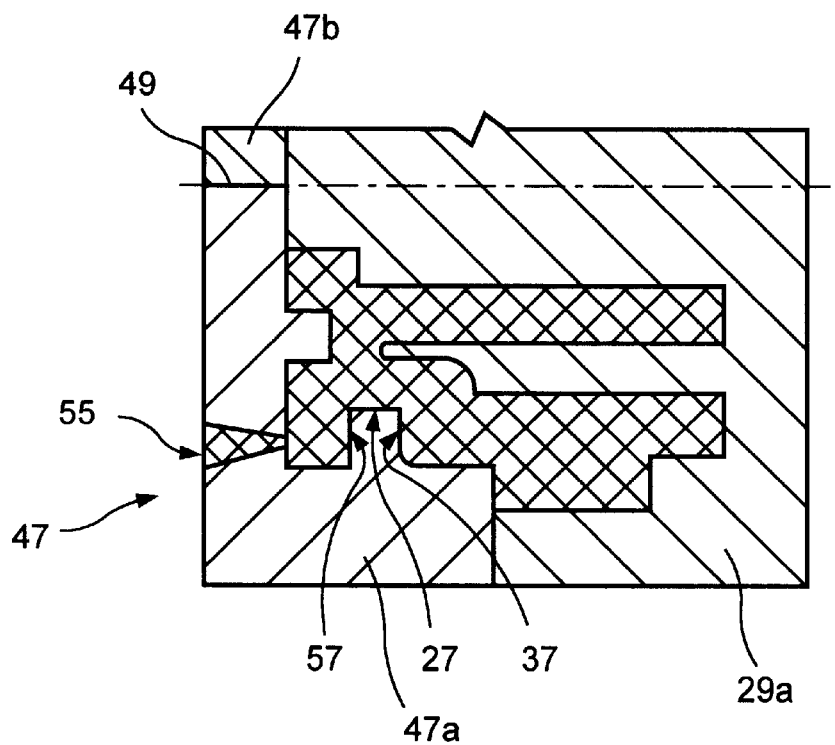
F I G. 3b

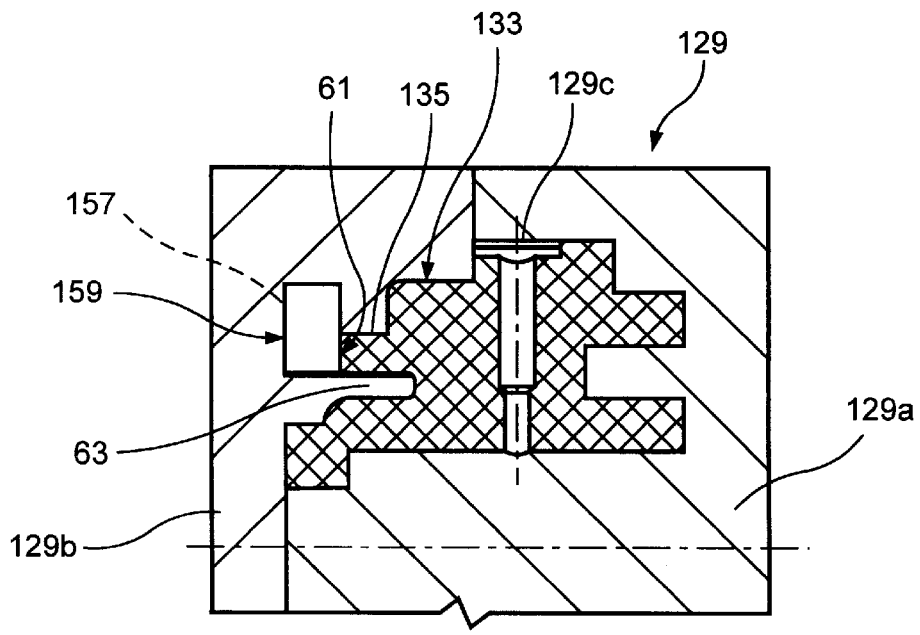
F I G. 4
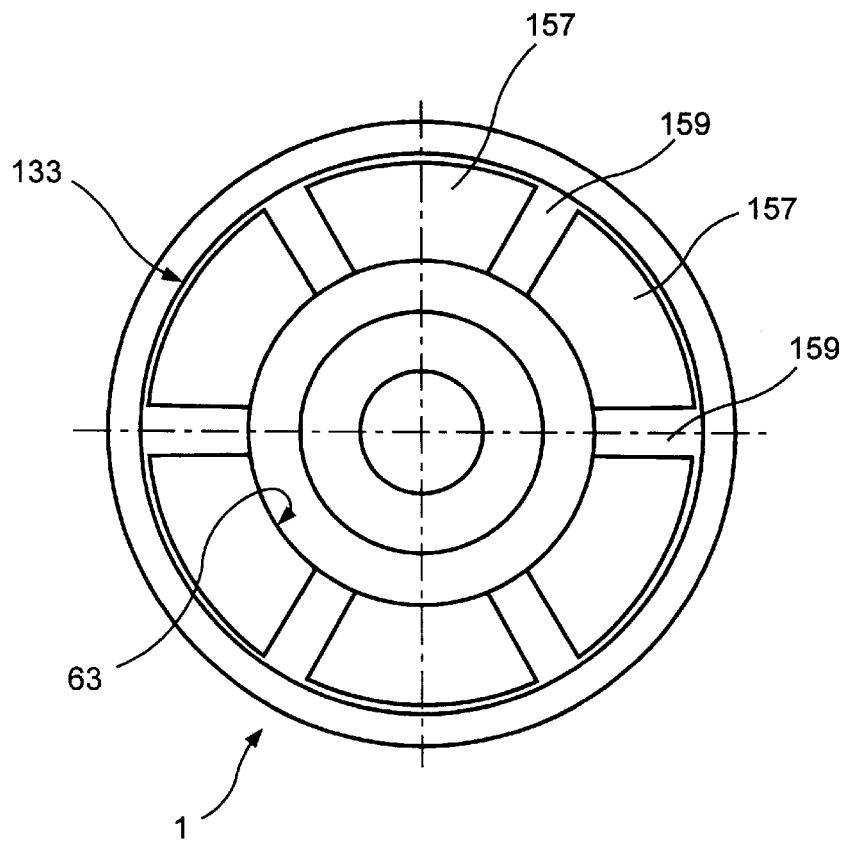
F I G. 5

METHOD OF MAKING A SUPPORT OF POLYMERIC MATERIAL HAVING A SEALING RING

BACKGROUND OF THE INVENTION

The present invention relates to a method of making a support of polymeric material having a sealing ring.

EP 0,217,013 B1 discloses a lockable piston-cylinder unit that has at one end a support of polymeric material that serves as a valve housing. The support of polymeric material has an annular seal, which seals off one end of the working space of the cylinder and is held in a groove in the support of polymeric material. The support has a front cover, the axial face of a circumferential cover edge providing a groove side wall by which the annular seal is retained in the receiving groove.

Each of DE 197 14 647 A1, DE 297 20 483 U1 and EP 0,383,303 B1 describes and shows a support of polymeric material for a piston-cylinder unit of like function, wherein the annular seal is injected in place onto the support. In all cases, care has been taken to see that the annular seal cannot slip off the support.

In an unloaded state of operation, the instantaneous pressure on the annular seal in the region of the sealing surface of the support of polymeric material is greater than on the opposing side. This effect is based on the area and pressure ratios of the piston-cylinder unit. In addition, when the piston-cylinder unit is filled, pressure is likewise suddenly applied to the annular seal, which might cause the annular seal to slide off. However, the possibility of slipping or sliding of the annular seal from the support of polymeric material is increased when unfavorable climatic conditions are present, for example, in the transport of piston-cylinder units in a container at ambient temperatures that cause the pretension of the annular seal to be reduced.

A cover-securing device, as in EP 217,013 B1, is rather undesirable with regard to assembly, since an additional part must be provided. In addition, care must be taken to see that the cover also maintains its specified position under all operating conditions.

In the case of seals injection-molded in place within an annular groove, attention has to be paid to compatibility between the material of the seal and the material of the support of polymeric material. Some polymeric materials, because of a highly impervious surface, combine with other types of polymeric materials only with great difficulty.

In the production of supports of polymeric material, two-part molds that part in the region of the groove may be used for the annular seal. Even with the greatest of care, divided molds often leave flash at the parting line, which adversely affects the surface quality of the area to be sealed.

Consideration has been given to whether there are other ways to dispense with axial securing of the sealing ring that faces toward and seals of a working space. It was found that there are sealing materials that are very resistant to changes in temperature but are also of the same composition, and therefore can only be used as a solution in a similarly sensitive application.

SUMMARY OF THE INVENTION

The object of the present invention is to provide a support of polymeric material having an annular seal, which is capable of operating even under elevated thermal stress, can be produced at a low cost, and has a high functional reliability.

According to the invention, the foregoing object is attained by-a method of making an injection-molded support of polymeric material having a cylindrical portion having an axis and an end, and an annular groove for a sealing ring located proximate to the end of the cylindrical portion and defined by a base surface, a sealing surface and a ring-retaining surface, the sealing surface being farther from the end of the cylindrical portion than the ring-retaining surface. The base surface and sealing surface are formed by a cavity of a first mold part that separates from the support in the direction of the axis of the cylindrical portion.

The advantages of the method are that very simple molds can be used for injection molding the support, and the base surface and sealing surface are free of mold flashes, since they have no seams due to mold-parting lines.

In some embodiments of the method, a seat portion for a circumferential flange having the ring-retaining surface is formed on the cylindrical portion by the cavity of the first mold, the seat portion including a circumferential rib or groove spaced apart from the base surface. The seat portion is elastically deformed upon separation of the first mold part from the support. The flange is then formed on the seat portion by a cavity in a second mold having two parts that separate radially at a parting plane that includes the axis of the cylindrical portion.

Preferably, the edge of the rib or groove closer to the sealing surface is spaced apart from the sealing surface by a distance (A) greater than the axial width of the base surface. With that relationship maintained, the rib or groove and the flange present shoulders that engage each other so that the flange is mechanically retained on the cylindrical portion. It is desirable for the rib or groove to be formed with a height (H) in the radial direction greater than a maximum possible elastic extension of the flange.

In other embodiments of the method of the present invention, the cavity of the first mold part forms a flange on the cylindrical portion having the ring-retaining surface. The flange is located axially between the end of the cylindrical portion and the base surface, and a part of the cylindrical portion including the flange is elastically deformed when the first mold part is separated from the support. The first mold part forms a plurality of radial slots in the flange to provide free space to receive portions of the flange adjacent the slot when the flange is deformed upon separation the first mold part from the support. The first mold part also forms a circumferential groove in an end portion of the cylindrical portion, the groove being spaced apart radially toward the axis from the base surface and underlying the flange and the base surface. The slots are formed by the first mold part to extend radially between the radially outer end of the flange and the circumferential groove, thus producing a slotted ring portion on the end of the support that is elastically collapsed radially inwardly when the mold part is separated from the support. It is desirable for the transition between the base surface and the flange to be formed to be rounded, which facilitates separating the first mold part from the support.

DESCRIPTION OF THE DRAWINGS

For a more complete understanding of the present invention, and the advantages thereof, reference may be made to the following written description of exemplary embodiments, taken in conjunction with the accompanying drawings.

FIGS. 3a and 3b are partial cross-sectional views of molds used to produce a support according to the first embodiment of the method of the present invention, the molds being modified as compared with those shown in FIGS. 2a and 2b;

FIG. 4 is a partial cross-sectional view of a mold used to make a support according to a second embodiment of the present invention; and FIG. 5 is an end elevational view of the support made by the process shown in FIG. 4.

DESCRIPTION OF THE EMBODIMENTS

Figure 1:
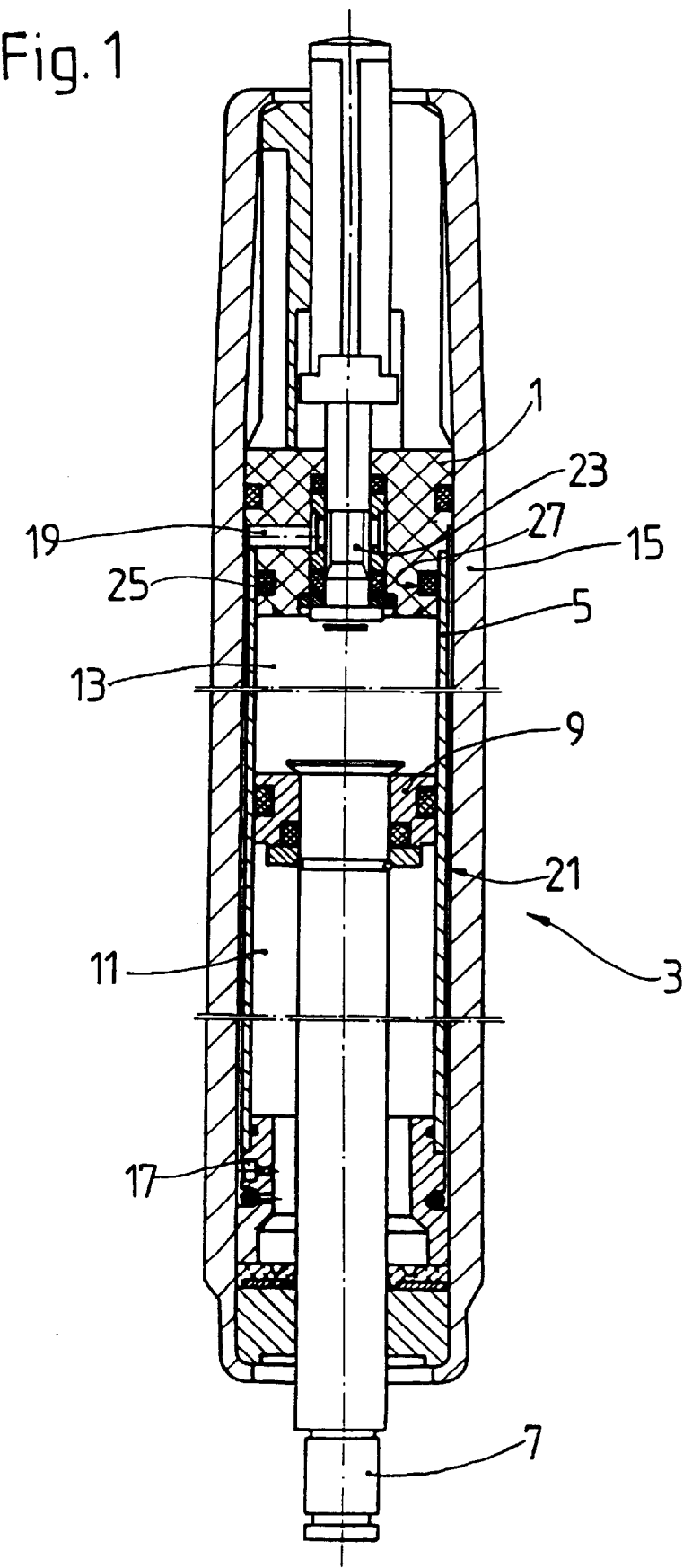
FIG. 1 is an axial cross-sectional view of a support of polymeric material embodying the present invention as installed in a piston-cylinder unit.

FIG. 1 shows a support of polymeric material 1, which is configured for use as a valve housing of a lockable piston-cylinder unit 3. A piston rod 7 is received for axial movement within a tube 5. The piston rod 7 carries a piston 9, which divides the tube 5 into a first working space 11 and a second working space 13. An outer cylinder 15 is arranged concentrically to the tube 5 and is filled with a fluid pressure medium. The two working spaces are communicated by radial passages 17 and 19 with an axial passage 21 provided by the annulus between the tube 5 and the cylinder 15. The flow between the working spaces 11 and 13 is controlled by a valve stem 23 within the support, whereby the piston rod 7 can be locked in a desired position along the length of the cylinder.

The working space 13 is sealed off from the working space 11 by a sealing ring 25, which is received in an annular groove 27 of the injection-molded support 1 and seals against the inner wall of the tube 5.

Figure 2A:
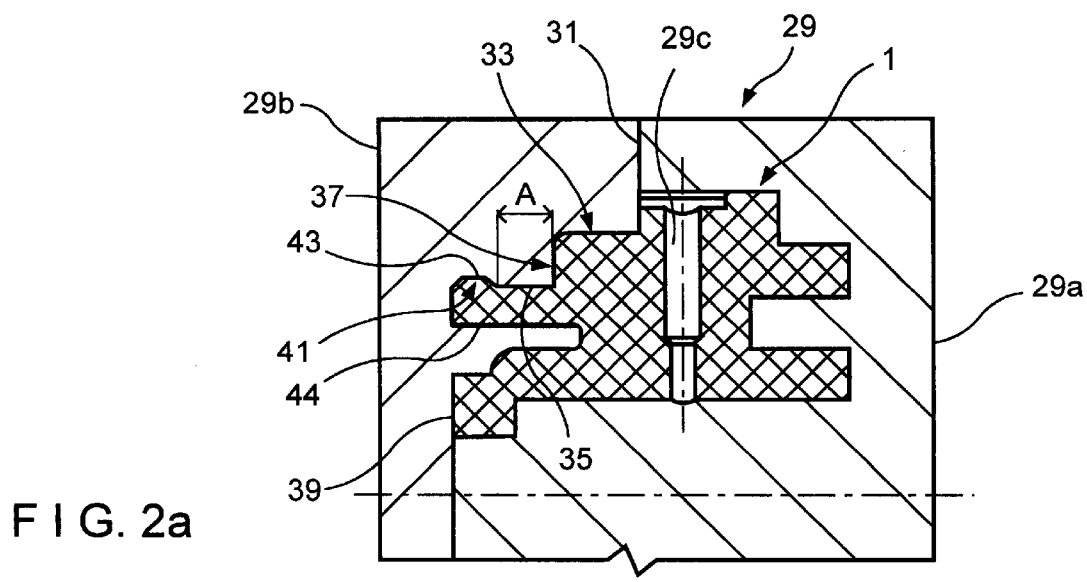
FIGS. 2a and 2b are partial cross-sectional views of molds used to produce a support according to a first embodiment of the method of the present invention.
Figure 2B:
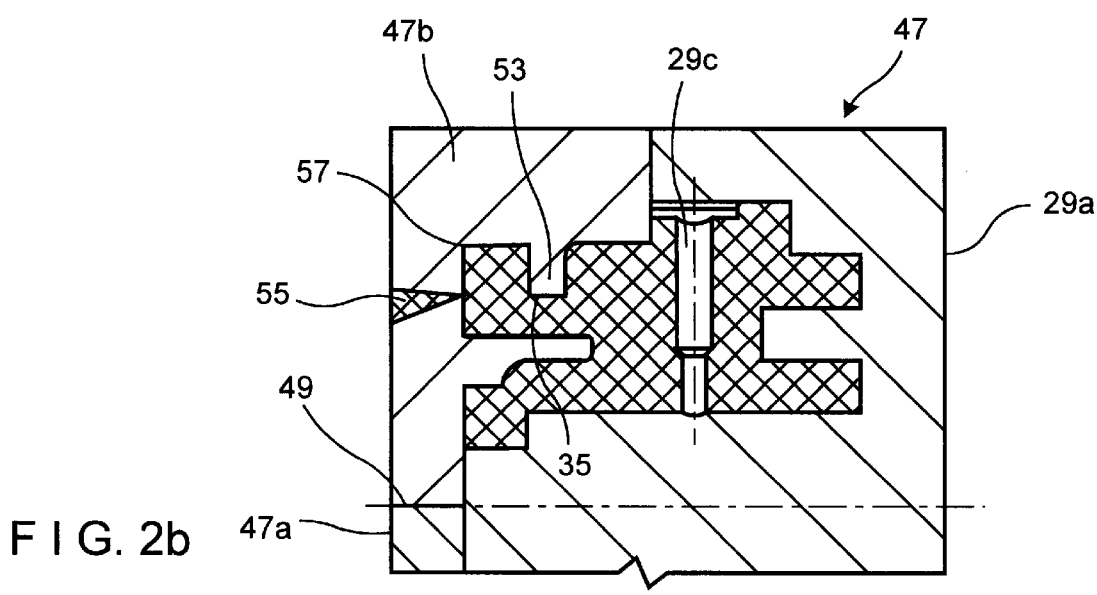

The support 1, according to one embodiment of the method, is produced by the molds shown in FIGS. 2a and 2b. (FIGS. 2a and 2b, 3a and 3b, and 4 show only portions of the molds, but the molds are symmetrical about their centerlines except that each mold has only one pin-like mold insert 29c, which forms the flow connection 19 (see FIG. 1)). A two-part mold 29, which consists of a first part 29a and a second part 29b, closes along a parting line 31. The parting line of the mold 29 is selected in such a way that no undercuts occur in the mold part 29a, since undercuts generally hinder the axial opening motion of a mold. Representation of the injection and venting channels has been dispensed with.

The cavity of the mold part 29b forms in a cylindrical portion 33 of the support 1 part of the groove 27 for the sealing ring 25, namely, a base surface 35 and a sealing surface 37. The cavity of the mold part 29b also forms a seat portion 41 for a flange (described below), a surface of which forms the ring-retaining surface of the groove 27. In the mold part 29b of FIG. 2a, the seat portion is a circumferential rib 43. The edge of the rib 43 nearer the sealing surface 37 is spaced apart from the sealing surface by a distance "A" that is greater than the width of the base surface 35 of the groove 27, so as to provide mechanical retention of the flange (as described below). After the partially molded support is molded in the mold 29 of FIG. 2a, the mold part 29b is separated from the support. Separation is permitted by elastic deformation and deflection of the end part of the cylindrical portion 33 such as to allow the mold part 29b to release from the rib 43. Deformation of the end part of the support in the region of the seat portion 41 is facilitated by forming a circumferential groove 44 in the end of the cylindrical portion 33.

As shown in FIG. 2b, a second mold 47 is used to inject a flange 57 (see FIG. 2c) over the seat portion 41 of the partially formed support shown in FIG. 2a. The second mold 47 includes the mold part 29a used in the first step (FIG. 2a) and two mold parts 47a and 47b that abut at a diametrical parting line 49 and are radially movable. Circumferential annular sections 53 of the two mold parts 47a engage in the annular groove partially limited by the base surface 35 and the sealing surface 37. The flange 57 is formed by injection of polymeric material through a passage 55 (shown only schematically). Despite the parting line 49, no injection flash forms in the region of the sealing surface 37. In practice, the base surface 35 separates the sealing surface. Should a flash form on the base surface 35 despite careful covering, it is not harmful to the function of the sealing ring 25 (see FIG. 1).

At the end of the molding step of FIG. 2b, the support of polymeric material, after removal of the mold half 29a and insert mold 29c and radial opening of the mold halves 47a and 47b may be used as a finished part without further working.

Figure 2C:
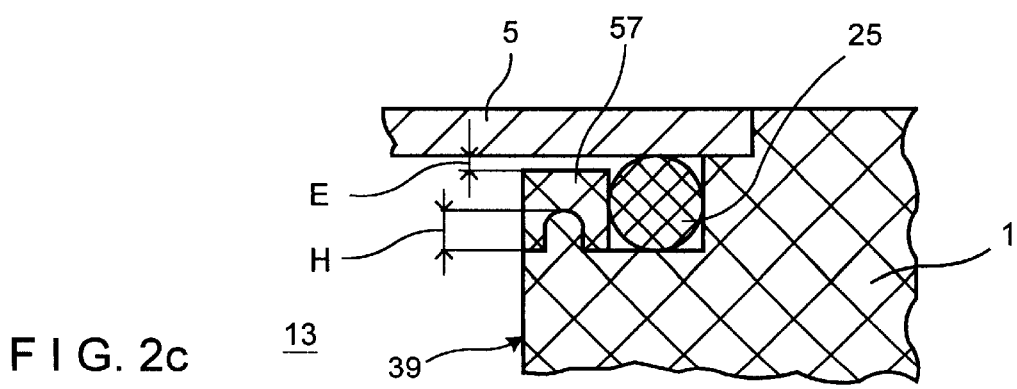
FIG. 2c is a fragmentary cross-sectional view of the portion of the support produced by the process of FIGS. 2a and 2b.

FIG. 2c shows in detail the relationship between the seat portion 41 (rib 43) and the spacing "E" between the outer surface of the flange 57 and the inner wall of the tube 5. Some polymeric materials form a highly impervious surface that offers sufficient adhesion for an additionally injected portion only with difficulty. In use of the piston-cylinder unit of FIG. 1, because of thermal stress it cannot be ruled out that the injected flange 57 may expand radially. So that sufficient mechanical retention between the flange 57 and the rib 43 is assured, the radial height H of the rib 43 is greater than a maximum expansion E of the flange 57, which is limited by the inner wall of the pressure tube 5.

FIGS. 3a and 3b show a modification of the process depicted in FIGS. 2a and 2b. The modification involves the form of the seat 41 for the flange 57. Instead of providing for formation of a rib (43) as the seat 41 for the flange 57 molded in the second step (FIG. 3b), the cavity of the mold part 29d is configured to form a groove 45. It is apparent that according to the concept of FIG. 2c the groove should be deep enough to allow for maximum expansion of the flange 57. Release of the mold part 29d from the support by axial movement involves deformation and deflection of part of the cylindrical portion 33' in the region of the groove 45.

FIG. 4 shows another embodiment of a method for making a support of polymeric material 1 according to the present invention. A mold 129 consists of two mold parts 129a and 129b and an insert mold 129c. The essential difference from the embodiments described above lies in that the flange 157 that provides the ring retaining surface of the groove 127 is produced in one molding process step along with formation of the remaining constituents of the support of polymeric material. The flange 157 is fully formed in the cavity of the mold part 129b and is deformed and deflected elastically when the mold part 129b is separated from the support by axial movement.

So that axial removal of the mold part 129b from the support is facilitated, the flange 157 has free spaces that are formed by circumferentially spaced-apart slots 159 that extend axially from the free end of the cylindrical portion 133 to the edge of the base surface 135 of the groove and radially between a circumferential groove 63 and the radially outer perimeter of the flange 157. The slots 159 thus divide the flange 157 into circumferential segments. An annular part of the cylindrical portion 133 in the region of the flange segments 157 is elastically collapsed radially inwardly when the mold part 129b is separated from the support. This elastic escape is improved by a rounded transition 61 between the base surface 135 and the ring-retaining surface of the flange 157.

What is claimed is:

1. A method of making an injection-molded support of polymeric material having a cylindrical portion having an axis and an end, an annular groove for a sealing ring located proximate to the end of the cylindrical portion and defined by a base surface, a sealing surface and a ring-retaining surface, the sealing surface being farther from the end of the cylindrical portion than the ring-retaining surface, wherein

- the base surface and the sealing surface are formed by a cavity of a first mold part that, following the formation of said base surface and said sealing surface, is separated from the support in the direction of the axis of the cylindrical portion;
- a seat portion for a circumferential flange having the ring-retaining surface is formed on the cylindrical portion by the cavity of the first mold, the seat portion including a circumferential rib or slot spaced apart from the base surface and being elastically deformed upon said separation of the first mold part from the support; and
- the flange is formed on the seat portion by a cavity in a second mold that replaces said first mold part, said second mold having two parts that separate radially at a parting plane that includes the axis of the cylindrical portion.

2. The method according to claim 1, wherein an edge of the rib or slot closer to the sealing surface is spaced apart from the sealing surface by a distance (A) greater than the axial width of the base surface.

3. The method according to claim 1, wherein the rib or slot is formed with a height (H) in the radial direction greater than a maximum possible radial elastic extension of the flange.

4. The method according to claim 1, wherein the cavity of the first mold part forms a flange on the cylindrical portion having the ring-retaining surface, the flange being located axially between the end of the cylindrical portion and the base surface, and a part of the cylindrical portion including the flange is elastically deformed when the first mold part is separated from the support.

5. A method of making an injection-molded support of polymeric material having a cylindrical portion having an axis and an end, an annular groove for a sealing ring located proximate to the end of the cylindrical portion and defined by a base surface, a sealing surface and a ring-retaining surface, the sealing surface being farther from the end of the cylindrical portion than the ring-retaining surface, wherein

- the base surface and the sealing surface are formed by a cavity of a first mold part that separates from the support in the direction of the axis of the cylindrical portion;
- the cavity of the first mold part forms a flange on the cylindrical portion having the ring-retaining surface, the flange being located axially between the end of the cylindrical portion and the base surface, and a part of the cylindrical portion including the flange is elastically deformed when the first mold part is separated from the support; and
- the first mold part forms a plurality of slots in the flange to provide free spaces to receive portions of the segments of the flange adjacent the slots when the flange is deformed upon separation of the first mold part from the support.

6. The method according to claim 5, wherein the first mold part forms a circumferential groove in an end portion of the cylindrical portion, the groove being spaced apart radially toward the axis from the base surface and underlying the flange and the base surface.

7. The method according to claim 6, wherein the slots are formed by the first mold part to extend radially between the radially outer end of the flange and the circumferential groove.

8. The method according to claim 6, wherein the transition between the base surface and a retaining surface of the flange is rounded.

9. The method according to claim 5, wherein the slots divide the flange into circumferential segments, and an annular part of the cylindrical portion in the region of the flange is elastically collapsed radially inwardly upon separation of the first mold part from the support.

\* \* \* \* \*